United States Patent [19]

Takanabe et al.

[11] Patent Number: 4,890,104
[45] Date of Patent: Dec. 26, 1989

[54] ELECTRONIC MAP DISPLAY SYSTEM FOR USE ON VEHICLE

[75] Inventors: Kazunori Takanabe, Kasugai; Masaki Yamamoto, Nagoya; Kenzo Ito, Okazaki; Hiroshi Fujinami, Anjo, all of Japan

[73] Assignee: Nippondenso Co., Ltd., Kariya, Japan

[21] Appl. No.: 160,010

[22] Filed: Feb. 24, 1988

Related U.S. Application Data

[62] Division of Ser. No. 910,296, Sep. 17, 1986, Pat. No. 4,780,717.

[30] Foreign Application Priority Data

Mar. 25, 1983 [JP] Japan .................................. 58-49957

[51] Int. Cl.⁴ .............................................. G08G 1/12
[52] U.S. Cl. .................................. 340/995; 73/178 R; 340/990; 364/424.01; 364/449
[58] Field of Search ............... 340/988, 990, 995, 712; 73/178 R; 364/424, 449, 460, 424.01

[56] References Cited

U.S. PATENT DOCUMENTS

| | | | |
|---|---|---|---|
| 4,086,632 | 4/1978 | Lions | 340/709 |
| 4,312,577 | 1/1982 | Fitzgerald | 340/995 |
| 4,504,913 | 3/1985 | Miura et al. | 340/995 |
| 4,571,684 | 2/1986 | Takanabe et al. | 340/995 |
| 4,608,656 | 8/1986 | Tanaka et al. | 340/995 |
| 4,630,209 | 12/1986 | Saito et al. | 340/995 |
| 4,646,089 | 2/1987 | Takanabe et al. | 364/449 |
| 4,660,037 | 4/1987 | Nakamura | 340/995 |
| 4,780,717 | 10/1988 | Takanabe et al. | 340/995 |

OTHER PUBLICATIONS

"The Lisa Computer System", Greg Williams, BYTE Publications, pp. 33-50, Feb. 1983.

Primary Examiner—Joseph A. Orsino
Assistant Examiner—Brent A. Swarthout
Attorney, Agent, or Firm—Cushman, Darby & Cushman

[57] ABSTRACT

An electronic map display system for use on a vehicle comprises a display unit for displaying one of a map or a menu of the names of a plurality of particular regions, a map data storage medium for storing map data on the particular regions and name information on the particular regions, a manual controller having a name retrieval key, a setting key, and cursor keys, and an electronic control unit for controlling the display on the display unit in response to instructions from the manual controller. Upon reception of an instruction produced by the name retrieval key of the manual controller, the electronic control unit reads the name information on the particular regions from the map data storage medium, displays the region names as the menu on the display unit, and selects one of the displayed region names through operation of the cursor keys. When the setting key is depressed, the electronic control unit reads map data related to the region name on the cursor position from the map data storage medium, and displays the map of the selected particular region on the display unit.

4 Claims, 20 Drawing Sheets

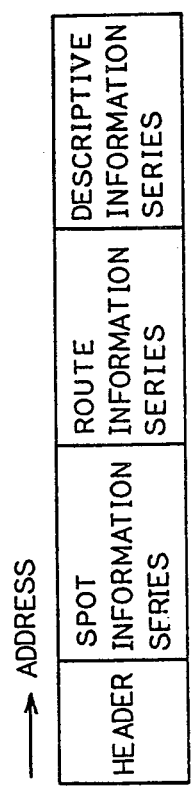
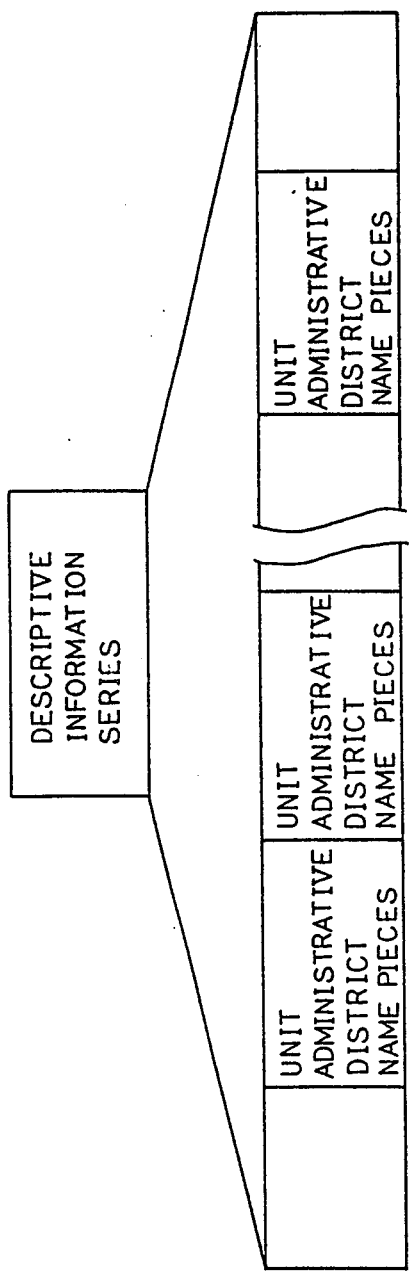

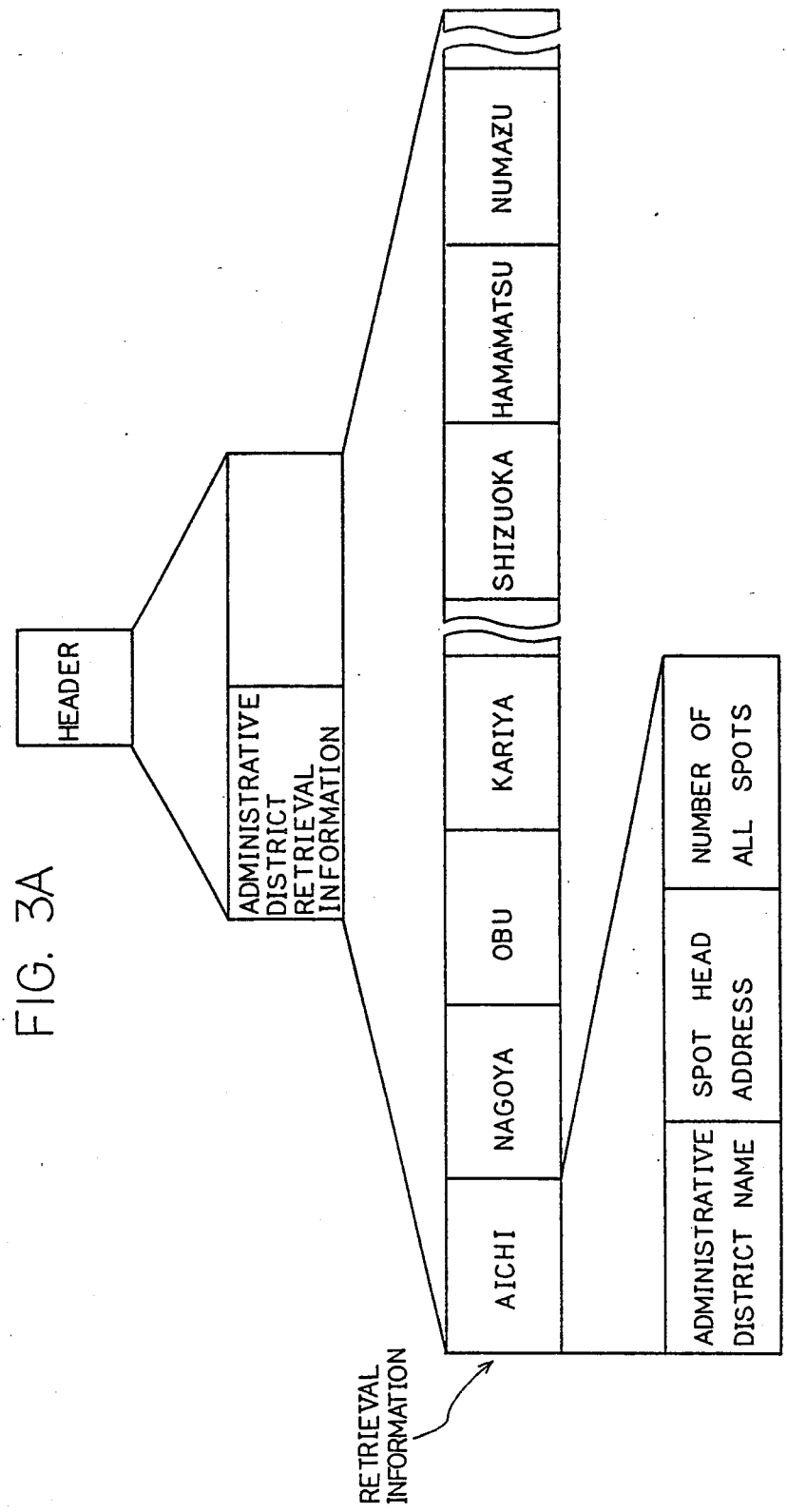

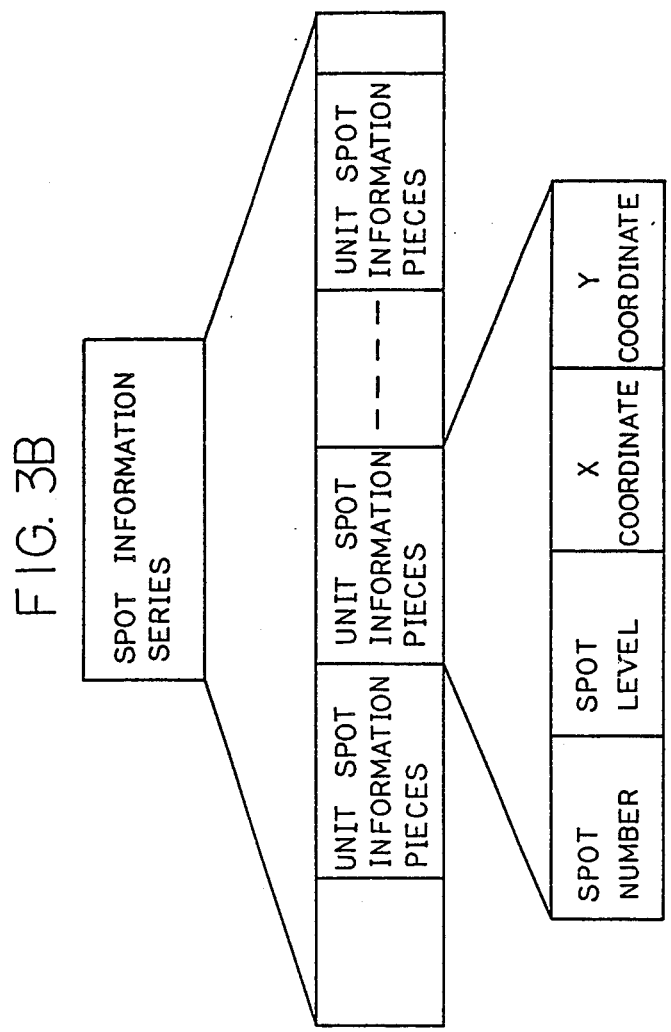

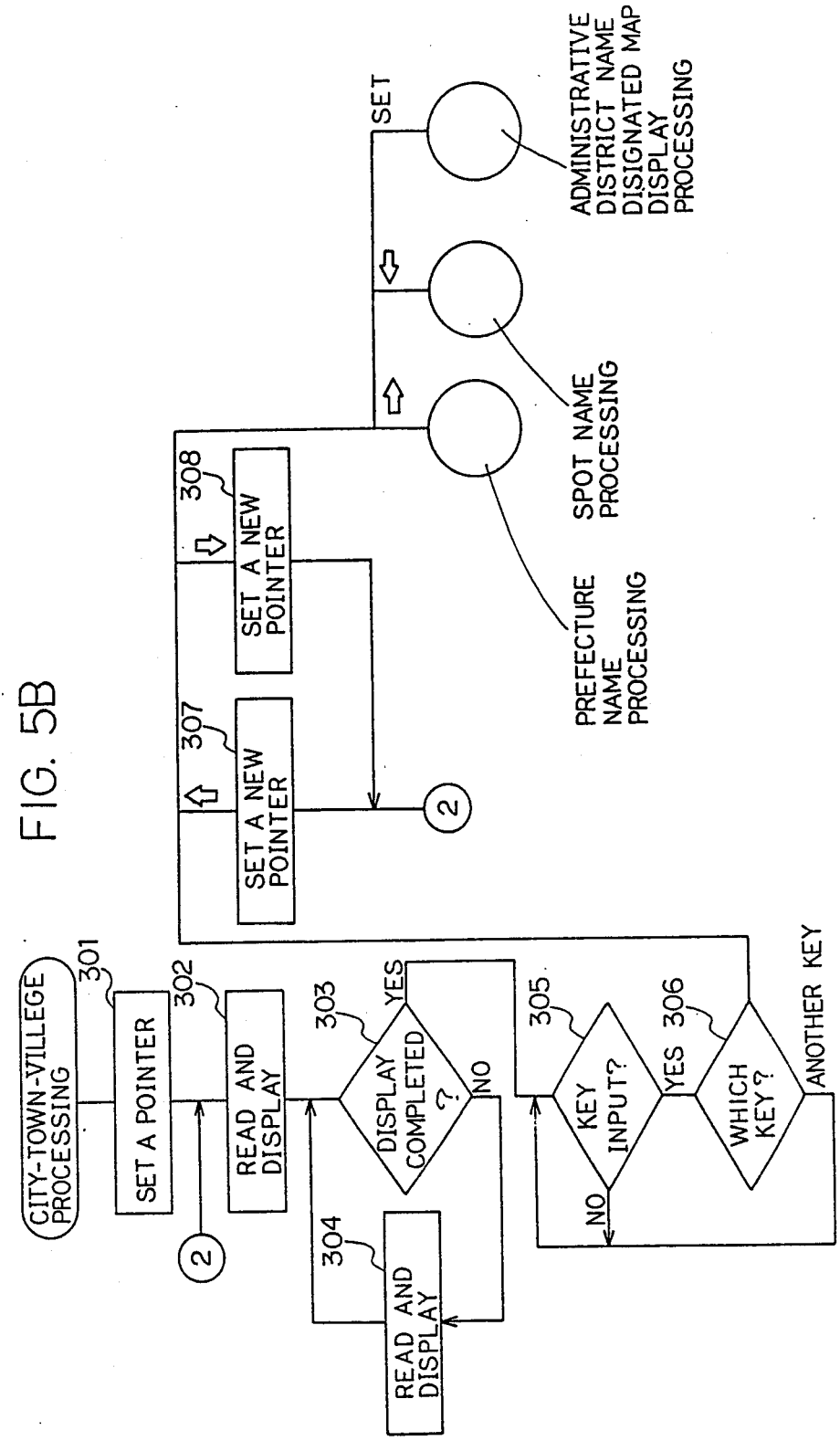

| (X1,Y1) \ (X2,Y2) | 0 | I | II | III | IV | V | VI | VII | VIII |
|---|---|---|---|---|---|---|---|---|---|
| 0 | x | x | x | x | o | o | x | o | o |
| I | x | x | x | o | o | o | o | o | o |
| II | x | x | x | o | o | x | o | o | x |
| III | x | o | o | x | o | o | x | o | o |
| IV | o | o | o | o | o | o | o | o | o |
| V | o | o | x | o | o | x | o | o | x |
| VI | x | o | o | x | o | o | x | x | x |
| VII | o | o | o | o | o | o | x | x | x |
| VIII | o | o | x | o | o | x | x | x | x |

ELECTRONIC MAP DISPLAY SYSTEM FOR USE ON VEHICLE

This is a division of application Ser. No. 910,296 filed Sept. 17, 1986, now U.S. Pat. No. 4,780,717.

BACKGROUND OF THE INVENTION

The present invention relates to electronic map display systems for use on a vehicle. More particularly, the present invention provides an electronic map display system capable of easily retrieving a map to be displayed on a display unit.

It is known to provide a map display system on a vehicle such as an automobile for aiding a driver in guiding the vehicle to a destination. One such known map display system contains maps to be displayed which are each identified by map numbers. A desired map can be selected and displayed when the driver or a passenger manually designates a map number identifying a desired map to be displayed.

This known map display system requires that a map number be designated by the user in order to display the corresponding map bearing that map number. Therefore, each time another map is to be displayed, its map number has to be checked. This is disadvantageous in that it takes a considerable period of time until the desired map can be displayed, a procedure which is tedious to perform.

SUMMARY OF THE INVENTION

It is therefore a primary object of the present invention to provide an electronic map display system for use on a vehicle which allows easy retrieval of a desired map.

Another object of the present invention is to provide an electronic map display system for use on a vehicle which includes a display map memory having as small a capacity as possible.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a diagram showing the overall arrangement of map data;

FIG. 3A is a diagram showing the arrangement of a header in the map data illustrated in FIG. 2;

FIG. 3B is a diagram of the arrangement of a series of spot information;

FIG. 3D is a diagram of the arrangement of a series of descriptive information;

FIGS. 4A and 5A through 5G are flowcharts showing a map retrieval and display process;

FIGS. 4B and 6A through 6F, 10A and 10B are illustrative of display examples.

DESCRIPTION OF THE PREFERRED EMBODIMENT

Figure 1:
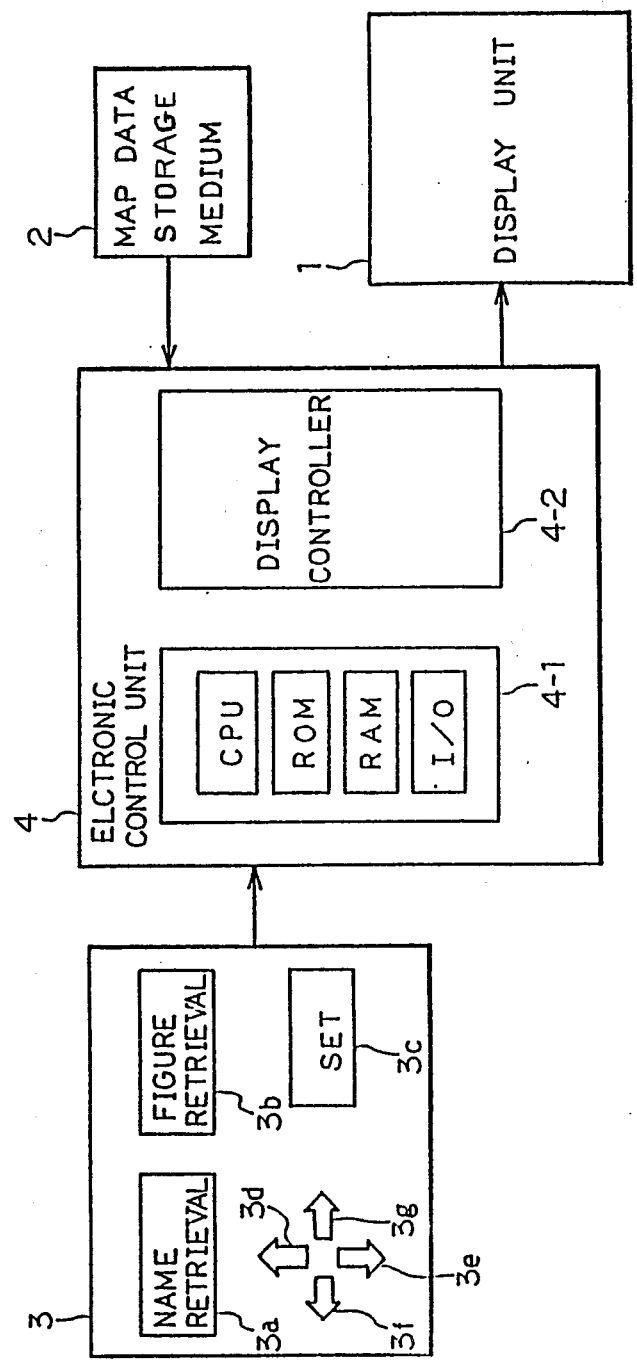
FIG. 1 is a block diagram of an electronic map display system according to the present invention.

The principles of the present invention are particularly useful when embodied in an electronic map display system as illustrated in FIG. 1.

As shown in FIG. 1, the electronic map display system includes a display unit 1 comprising a cathode-ray tube or a liquid-crystal dot-matrix display device, a map data storage medium 2 such as a ROM package or a magnetic tape containing map data, and a manual controller 3 having a name retrieval key 3a for indicating name retrieval, a figure retrieval key 3b for indicating figure retrieval, a setting key 3c, and cursor keys 3d, 3e, 3f, 3g for moving a cursor upwardly, downwardly, leftward, and rightward. The electronic map display system also includes an electronic control unit 4 having a microcomputer 4-1 including a CPU, ROM, RAM, I/O circuit, and other components, and a display controller 4-2. The electronic control unit 4 is responsive to at least instruction signals from the manual controller 3 for processing input signals and data and enabling the display controller to display a menu, a cursor, and maps on the display unit 1.

The map data stored in the map data storage medium 2 has a data arrangement comprising, as shown in FIG. 2, a header, a series of spot information, a series of route information, and a series of descriptive information. As illustrated in FIG. 3A, the header has administrative district retrieval information composed of pieces of prefecture (a geographical region) retrieval information such as Aichi prefecture retrieval information. Aichi prefecture retrieval information, for example, includes an administrative district name address corresponding to the address of an administrative district name of the series of descriptive information, a spot head address indicative of a head number out of each of the spot groups constituting the administrative district, and the total number of all spots which is the number of the spot groups constituting the administrative district.

As shown in FIG. 3B, the series of spot information is composed of pieces of unit spot information each comprising a spot number representative of the spot, a spot level allotted to the scale of a display map, and X and Y coordinates of the spot with respect to a reference coordinate spot (Tokyo, for example). These spots are employed to constitute routes and to determine a scale of a map as will be described later on.

Figure 3C:
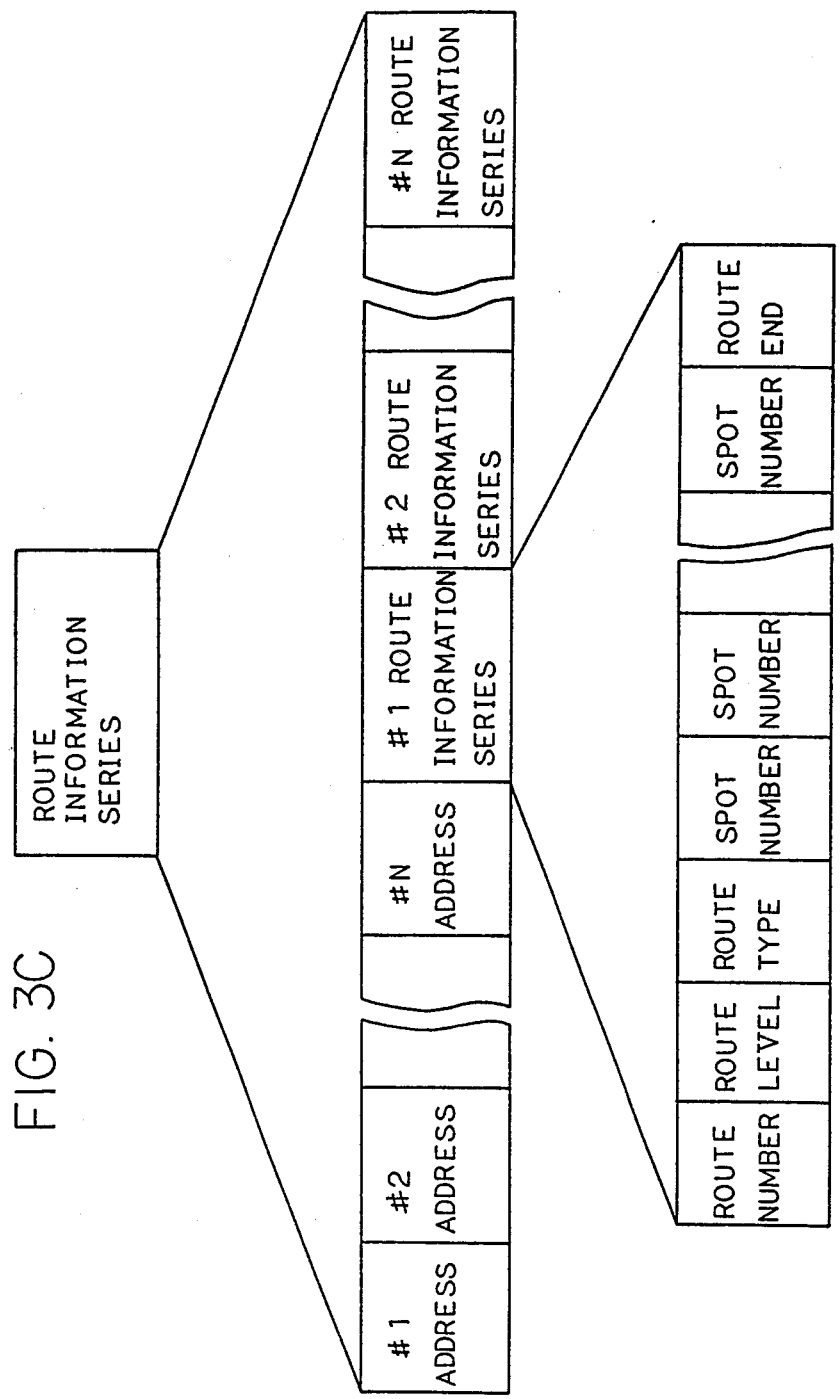
FIG. 3C is a diagram of the arrangement of a series of route information.

The series of route information comprises, as shown in FIG. 3C, a series of #1 through #N route information and #1 through #N addresses for designating the addresses of the route information series, respectively. Each route information series has a route number indicating the route, a route level assigned to the display mode of a display map, a route type indicating the type of the route (for example, national road, prefectural road, coastline, railroad, express highway, or the like), spot numbers indicating spot groups forming the route, and a route end showing the end of the route. As shown in FIG. 3D, the series of descriptive information has pieces of unit administrative district name information each for displaying the name of an administrative district or a spot.

Figures 4A, 4B:
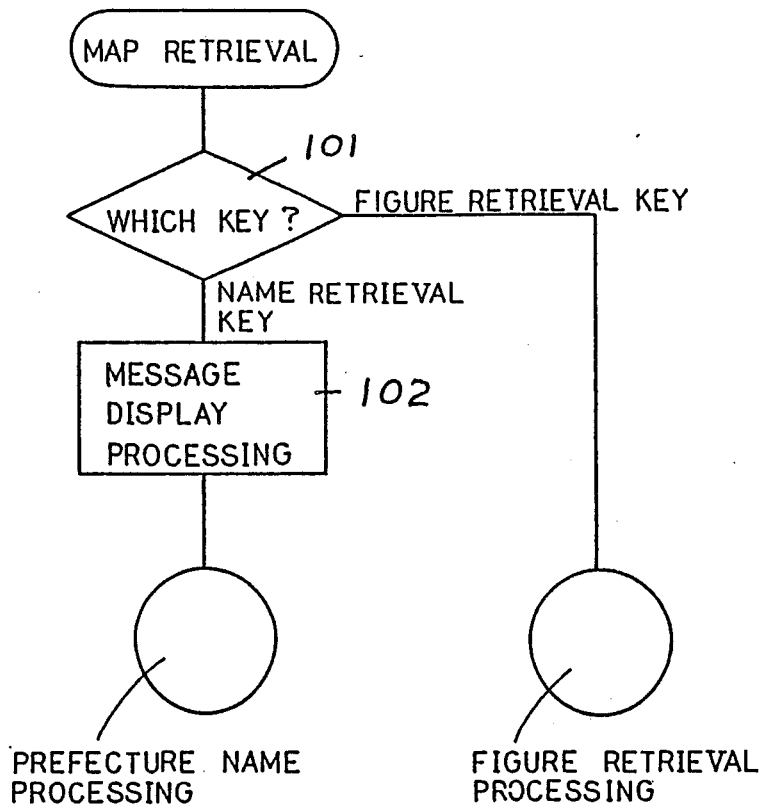
Figure 5A:
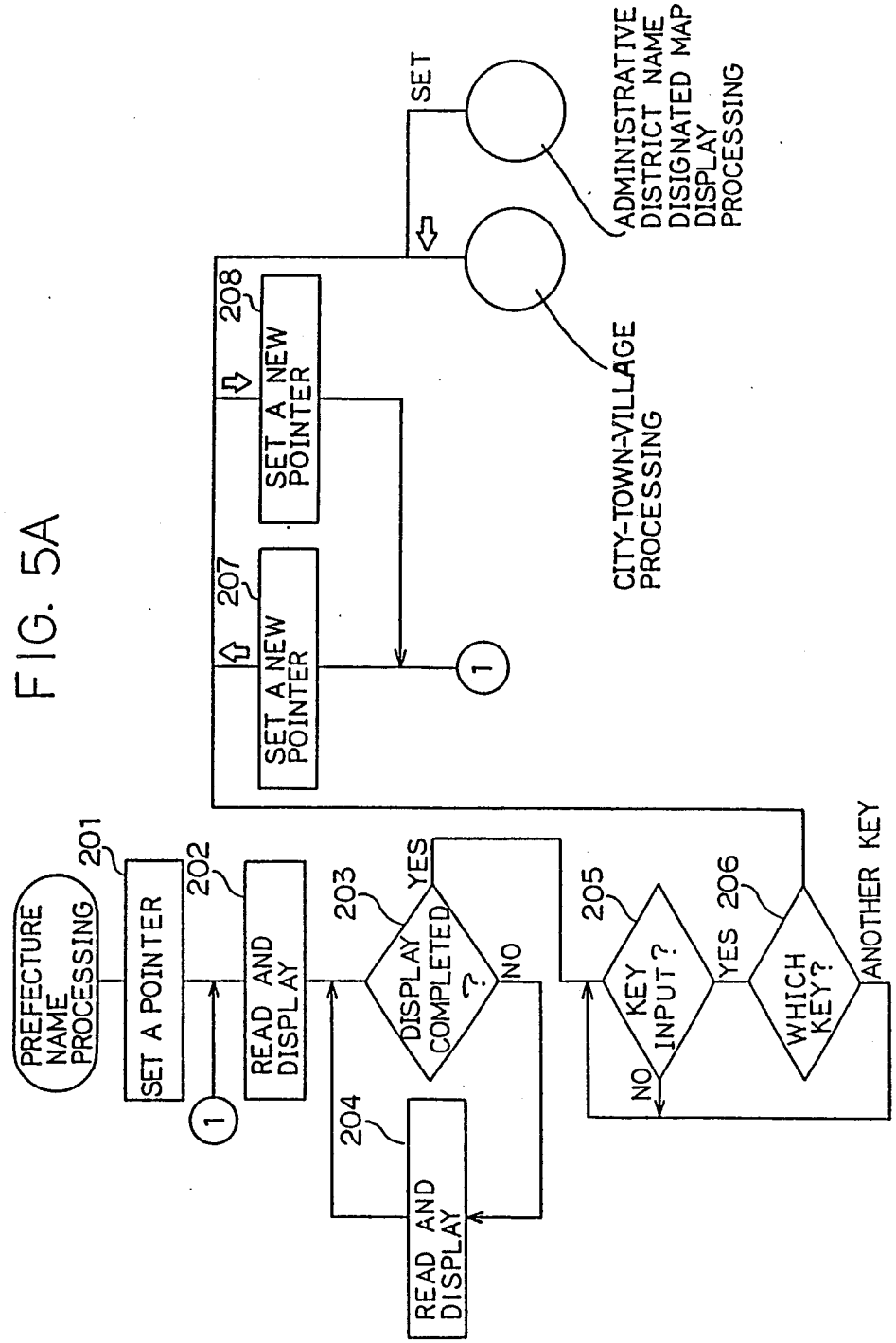
Figure 5C:
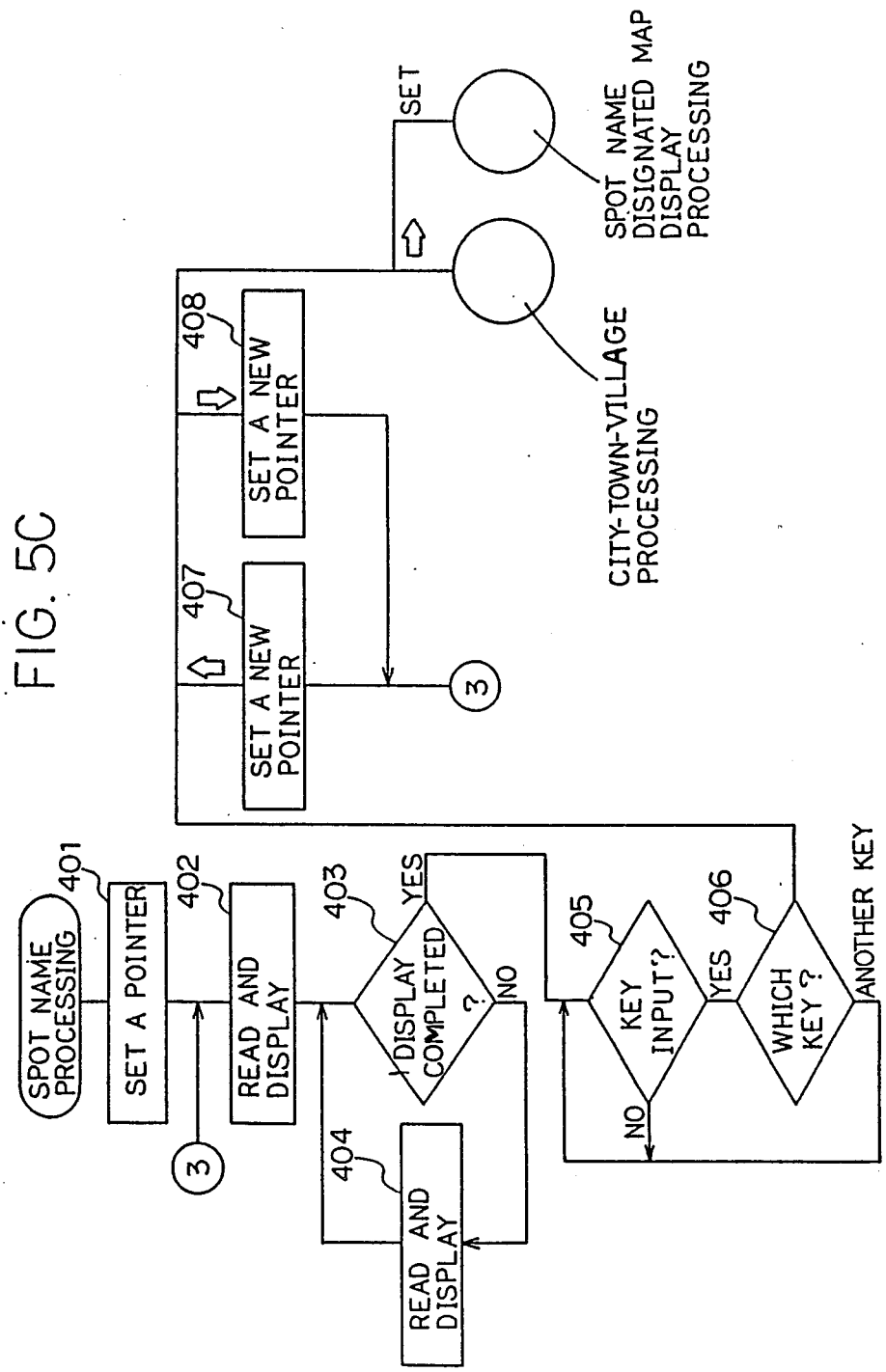

Processing operation of the electronic control unit 4 will now be described with reference to FIGS. 4A through 10B. When the name retrieval key 3a or the figure retrieval key 3b is depressed in the manual controller 3, a step 101 shown in FIG. 4A is executed to determine whether the depressed key is the name retrieval key 3a for displaying a desired map based on the name of an administrative district or a spot, or the figure retrieval key 3b for displaying a map directly on display unit 1 or displaying an enlarged map with a desired spot centrally positioned on the basis of the initially displayed map. If the depressed key is the figure retrieval key 3b, then a figure retrieval process will be executed as shown in FIG. 5F (described later on). If the depressed key is the name retrieval key 3a, then a step 102 is executed to display message prior to the display of an administrative name or a spot name for retrieval on the display unit 1. The message display processing enables the display unit 1 to display a message such as shown in FIG. 4B.

Then, prefecture name processing is performed. The prefecture name processing is executed according to the flowchart of FIG. 5A.

First, a step 201 is executed to set a head prefecture retrieval address (address corresponding to Aichi prefecture retrieval information in the administrative district retrieval information) as a pointer.

Then, a step 202 is executed to read the administrative district name information according to a pointer in the prefecture retrieval information and to display the name together with the cursor on the screen of the display unit 1.

A step 203 is then executed to determine whether a prescribed number of prefecture names (number of all prefectures that can be displayed on the basis of the map data) have been displayed or not.

If the prescribed number of prefecture names have not yet been displayed, then a step 204 is executed to read the prefecture name of the next address and display the prefecture name on the display screen. This name display is effected by employing data in the descriptive information series shown in FIG. 3D.

Figure 6A:
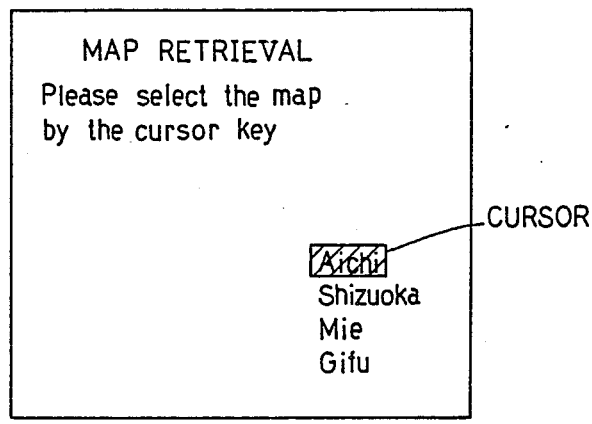

When the prescribed number of prefecture names have been displayed on the display unit 1 as shown in Fig. 6A the program goes through the branch "YES" of the step 203 to a next step 205.

The step 205 determines whether there has been a key-induced input from the manual controller 3. If there has been a key input, then the program goes to a next step 206 which determines whether the depressed key is the up cursor key 3d for moving the cursor upwardly, the down cursor key 3e for moving the cursor downwardly, the left cursor key 3f for moving the cursor leftward, the setting key 3c for displaying a map, or another key depressed in error.

Figure 6B:
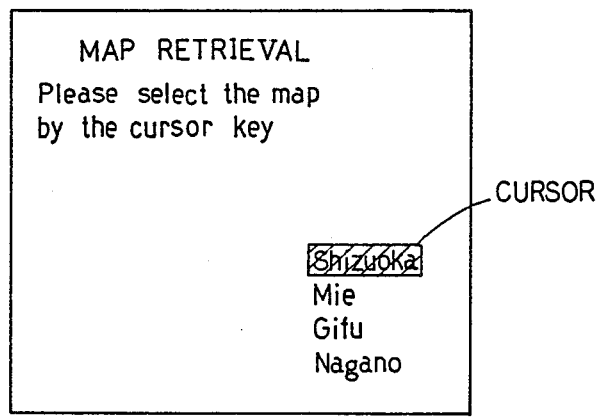

If the up cursor key 3d has been depressed, then a step 207 is executed to set as a new pointer a prefecture retrieval address corresponding to a prefecture next to the prefecture on the current cursor position, and then the program returns to the step 202. By effecting the process subsequent to the step 202, the display unit 1 displays prefecture names as shown in FIG. 6B in which the Shizuoka prefecture becomes a new pointer.

If the down cursor key 3e has been depressed, then a step 208 is executed to set as a new pointer a prefecture retrieval address corresponding to a next prefecture that has been on the cursor position so far, and then the program goes back to the step 202. When the display unit 1 has displayed the prefecture names as shown in FIG. 6B, the display unit 1 displays the data again as shown in FIG. 6A, with Aichi prefecture serving as a new pointer.

If the left cursor key 3f has been depressed, then city-town-village processing is initiated.

Figure 5D:
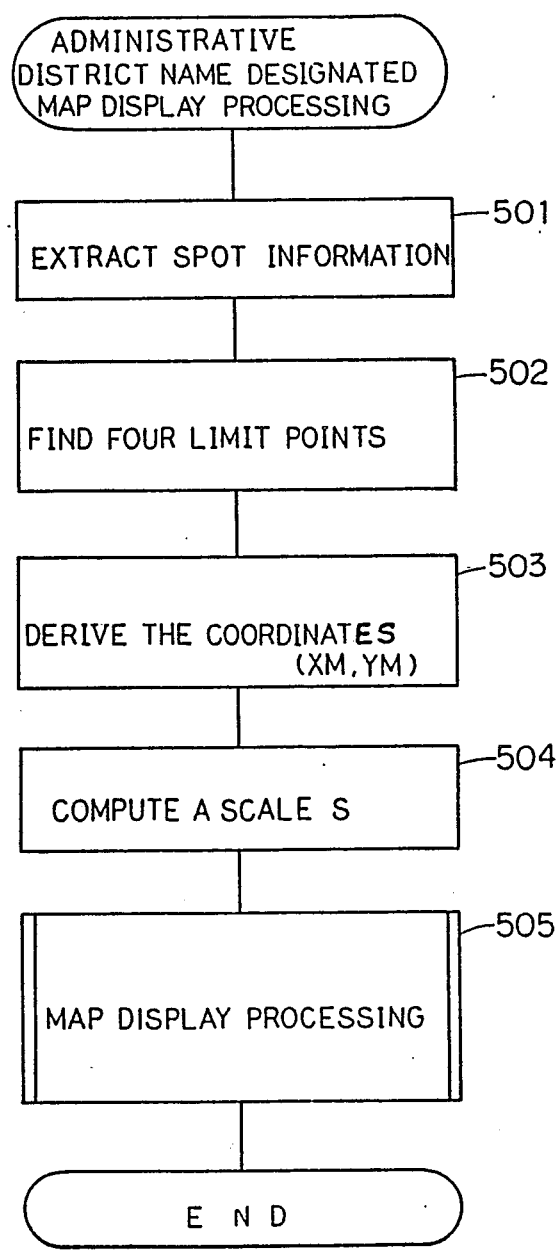

If the set key 3c has been depressed, then the display of a map designated by an administrative district name (as described later on) is performed according to processing as shown in FIG. 5D.

As described above, the prefecture name processing displays the names of prefectures belonging to the entire map stored in the map data storage medium 2 and also the cursor on the display unit 1.

The city-town-village processing will now be described with references to FIG. 5B.

Figure 6C:
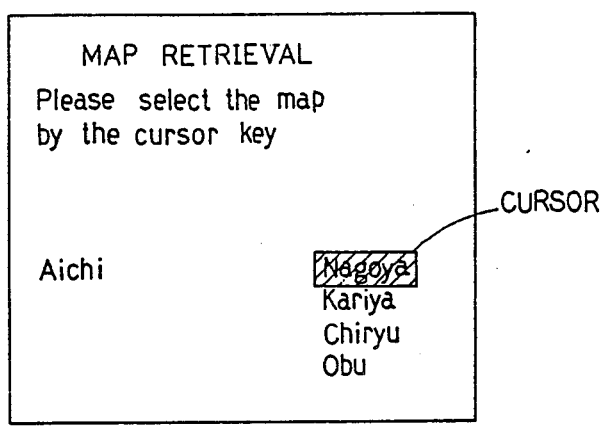
Figure 6D:
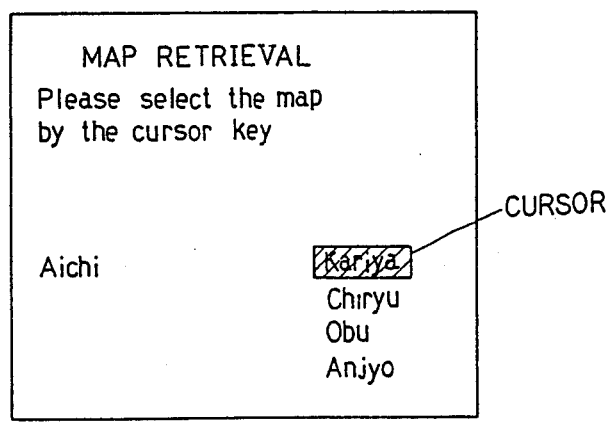

As shown in FIG. 5B, steps 301 through 308 correspond to the steps 201 through 208, respectively, in the prefecture name processing as illustrated in FIG. 5A. When the left cursor key 3f is depressed while the cursor is positioned on Aichi prefecture during the prefecture name processing, the names of cities, towns, and villages belonging to Aichi prefecture are displayed together with the cursor on the display unit 1. A display example for such an instance is shown in FIG. 6C. In the illustrated display example, Nagoya city serves as a pointer for city-town-village retrieval information addresses. When the down cursor key 3e is then depressed, the display unit 1 displays an example shown in FIG. 6D in which Kariya city becomes a new pointer. When the up cursor key 3d is then depressed, the display unit 1 displays the example of Fig. 6C again to set Nagoya city as a new pointer.

If the right cursor key 3g is depressed during the city-town-village processing, then the foregoing prefecture name processing is reinstated. If the left cursor key 3f is depressed, then spot name processing is started.

Figure 6E:
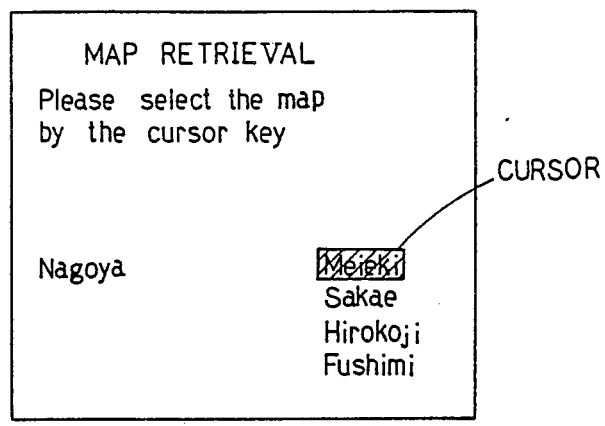
Figure 6F:
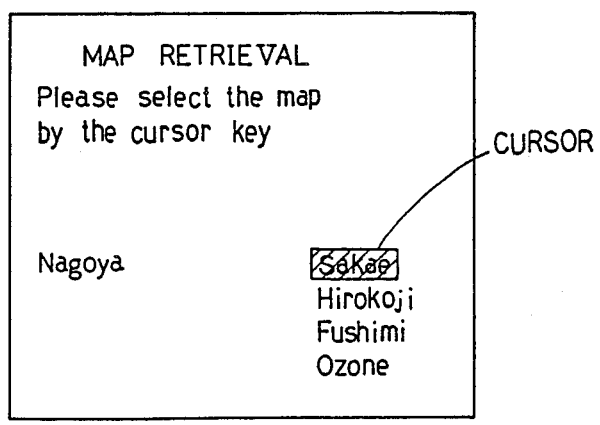

FIG. 5C illustrates a flowchart for such spot name processing. Steps 401 through 408 in FIG. 5C correspond to the steps 201 through 208, respectively, in the prefecture name processing as illustrated in FIG. 5A. When the left cursor key 3f is depressed while the cursor is positioned on Nagoya city as shown in FIG. 6C, the display unit 1 displays a display example as shown in Fig. 6E. When the down cursor key 3e is then depressed, the display unit 1 displays a display example as shown in Fig. 6F in which a unit spot information address pointer is changed from Meieki to Sakae. When the up cursor key 3d is then depressed, the display unit 1 displays the display example as shown in FIG. 6E again with Meieki as a new pointer.

If the setting key 3C is depressed during the spot name processing, then spot name designated map display processing is effected as will be described later on with reference to FIG. 5E.

If the setting key 3E is depressed during the prefecture name processing or the city-town-village processing, then administrative district name designated map display processing is started as shown in FIG. 5D. This processing is started by executing a step 501 to extract spot information for spots belonging to a designated administrative district. Then, a step 502 is executed to find four limit points which are the spots on eastern, western, northern, and southern ends (corresponding respectively to points $\alpha$, $\beta$, $\gamma$, $\delta$ in FIG. 7A) of the extracted spots. The program then goes to a step 503 which derives the coordinates (XM, YM) of a central point of the administrative district from the four limit points according to the following equations:

XM = (X coordinate of the point $\alpha$ + X coordinate of the point $\beta$) / 2, and YM=(Y coordinate of the point γ+Y coordinate of the point δ) / 2.

Then, a step 504 is executed to compute a scale S in which the entire administrative district can be displayed on the screen of the display unit 1. A step 505 is executed to display the map of the administrative district on the display unit 1. This map display processing will be described later with reference to Fig. 5G.

Figure 5E:
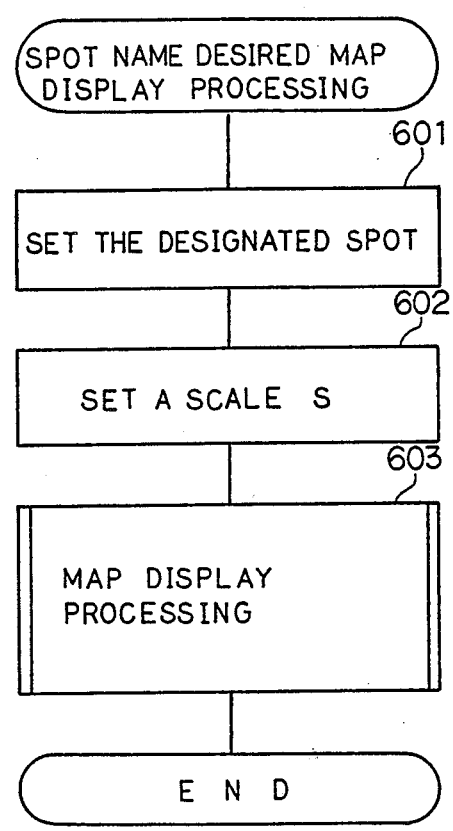
Figure 5F:
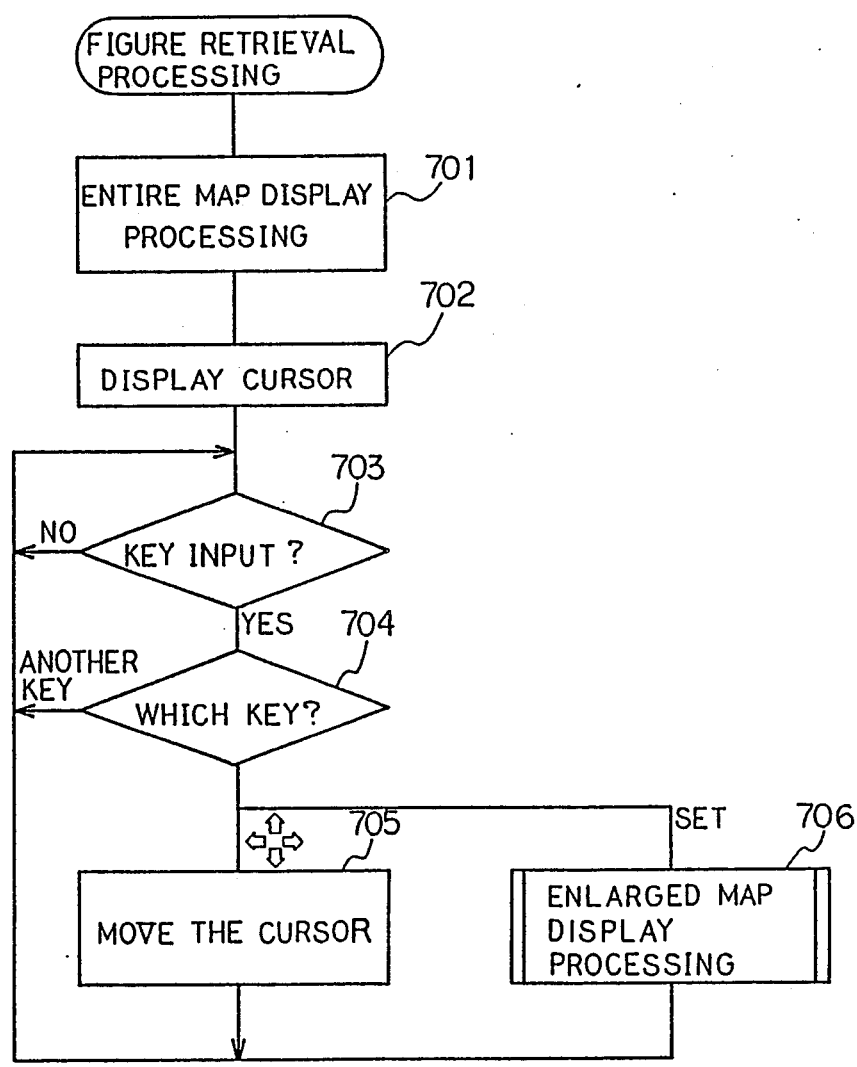

If the setting key 3C is depressed while the spot name processing is being performed, then the spot name designated map display processing is started as shown in FIG. 5E.

In the spot name designated map display processing, a step 601 is first executed to set the designated spot as central coordinates (XM, YM). Then, a step 602 is executed to set a predetermined scale S for spot map display, and the map is displayed at the selected scale S in a step 603. This map display processing will be described later with reference to FIG. 5G.

Figure 10A:
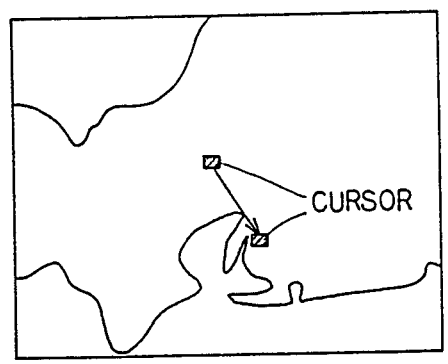
Figure 10B:
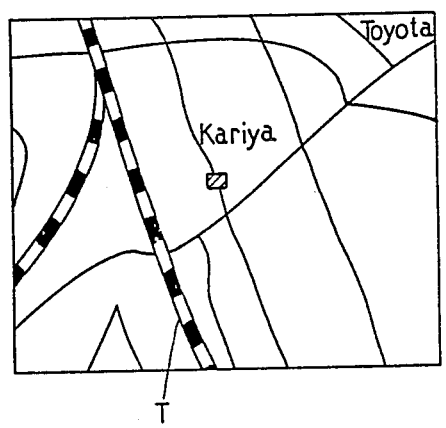

If the figure retrieval key 3b is depressed in the step 101 in FIG. 4, then figure retrieval processing is started as shown in FIG. 5F. In the figure retrieval processing, a step 701 is first executed to read out map data from the map data storage medium 2 and display the entire map on the display unit 1 as shown in FIG. 10A according to the predetermined central coordinates (XM, YM) and the scale S set for the entire map display. This map display processing will be described later on with reference to FIG. 5G. Then, a step 702 is executed to display the cursor in the center of the displayed map at the central coordinates (XM, YM). The program then proceeds to a step 703 to determine whether there has been a key-induced input from the manual controller 3. If there has been a key input, then a step 704 determines which key has been depressed. If the depressed key is either one of the cursor keys 3d through 3f, then a step 705 is executed to move the cursor as dictated by the depressed cursor key. If the depressed key is the setting key 3c, then a step 706 is executed to display an enlarged map according to a scale S set for enlarged map display and the central coordinates (XM, YM) corresponding with the cursor position. This map display processing will be described later on with reference to FIG. 5G. According to the processing, if the cursor has been moved to the position corresponding with the Kariya city from the center of the displayed map, the map of Kariya city is displayed on the display unit 1 as shown in FIG. 10B.

Figure 5G:
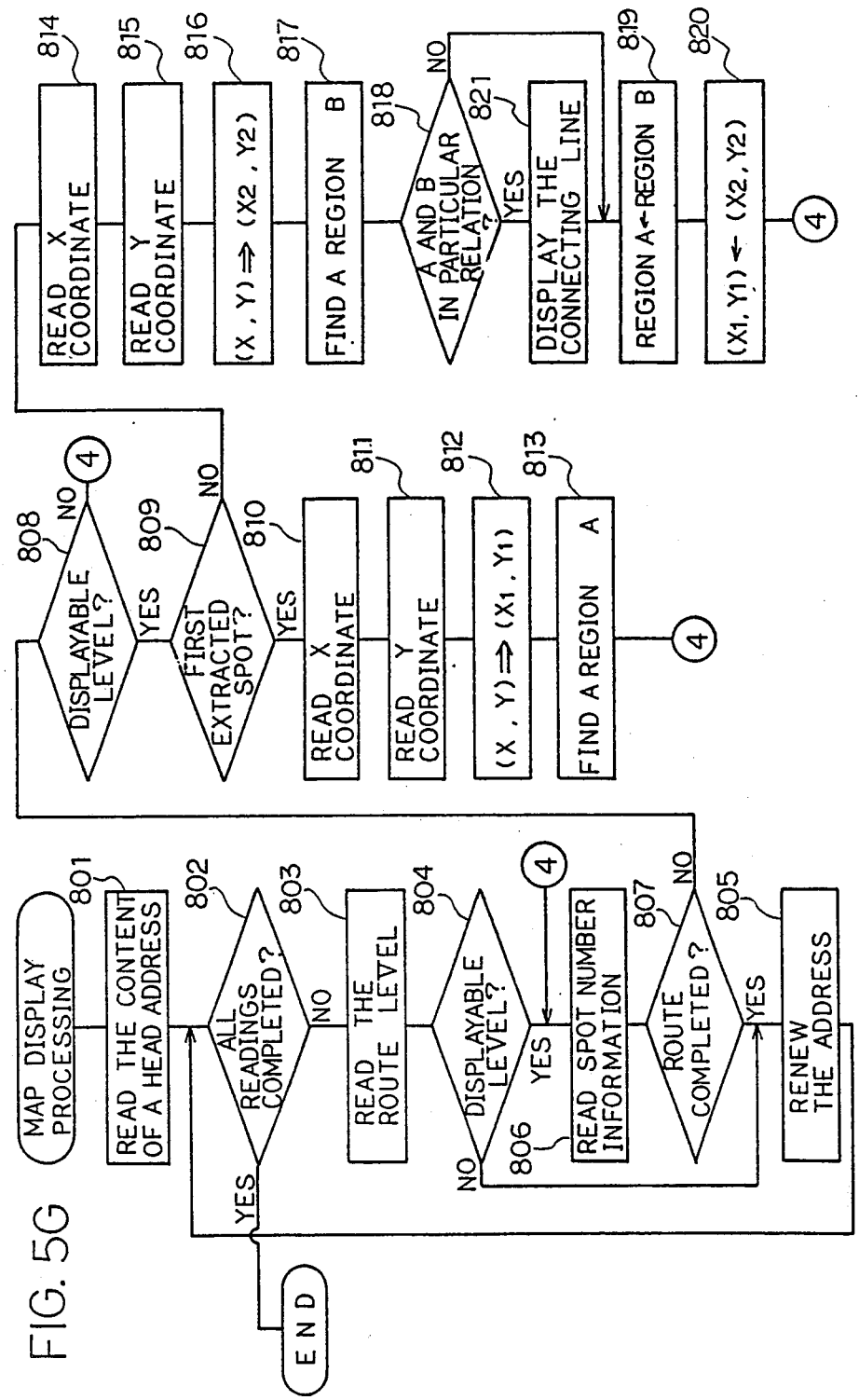

FIG. 5G is illustrative of the process of the map display step 505 in the administrative district name designated map display processing, the map display step 603 in the spot name designated map display processing, and the map display steps 701, 706 in the figure retrieval processing.

The map display processing is initiated by executing a step 801 to read the content of a head address in the route information series in the map data storage medium 2. Then a step 802 is executed to determine whether the contents of all addresses have been read out. Since the step 802 is effected immediately after the content of the head address has been read, the program goes through the branch "NO" of the step 802 to a step 803 in which the route level is read from a #i route information series (#1 route information series) designated by an #i address (which is the head address at this time). The route level may be regarded as relative importance is allotted to each route, as described above.

Then, a step 804 is executed to determine whether the route level is of a displayable level, that is, the #i route (#1 route) has importance to be displayed relatively to the scale designated as described above.

If the #i route (#1 route) is a route which may not be displayed, then the program goes to a step 805 to renew the address, or read the content of a next address (#2 address), and then back to the step 802.

If the #i route (#1 route) is a route to be displayed, a step 806 is executed to read spot number (head spot number at this time) of the #i route information series.

Then, a step 807 is executed to determine whether the route end of the #i route information series (#1 route information series) has been read out.

Since the step 807 is carried out immediately after the head spot number has been read out, the step 807 decides "NO", and the program goes to a step 808 which reads spot level given to the spot number of a spot information series in agreement with the spot number (head spot number), and which determines whether this spot is a spot having importance to be displayed relatively to the scale designated as described above.

If the spot is a spot which may not be displayed, then the program goes back to the step 806 to read a next spot number in the #i route information series (#1 route information series).

If, on the other hand, the spot is a spot found to be displayed, then a step 809 is executed to determine whether the spot number is the spot number extracted at first in the #i route information series (#1 route information series).

Since the spot number is the first number at this time, the decision of the step 809 is "YES", and then steps 810 through 813 are executed to read X and Y coordinates of the spot, convert the coordinates (X, Y) into display coordinates (X1, Y1), and find a region A to which the display coordinates (X1, Y1) belong.

Figure 7A:
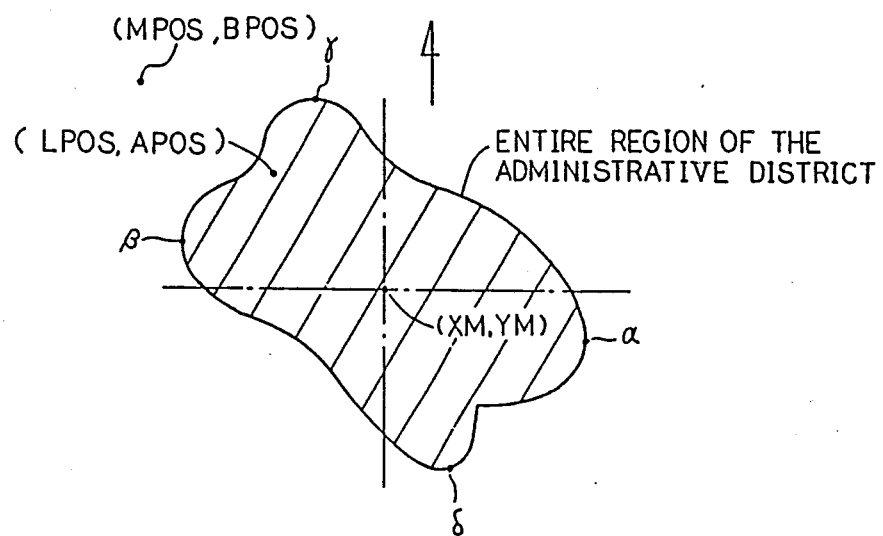
FIGS. 7A, 7B, 8A, 8B, 9A and 9B are diagrams explanatory of the flowcharts shown in FIGS. 4 and 5A–5G.
Figure 7B:
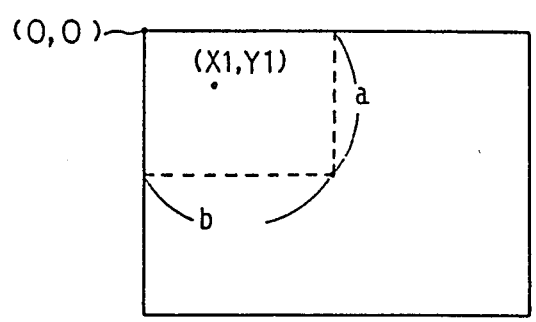
Figure 8A:
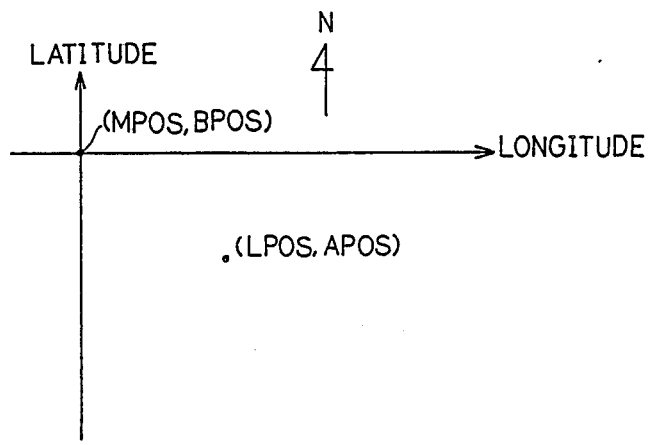
Figure 8B:
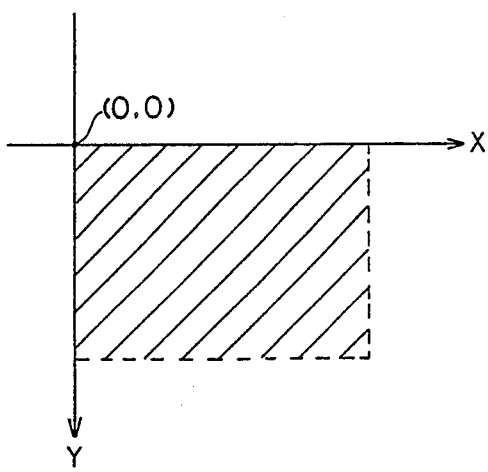

The above coordinate transformation processing is performed, as shown in FIG. 7A illustrating an earth coordinate system and FIG. 7B illustrating a display coordinate system, by finding coordinates (MPOS, BPOS) on the earth coordinate system which are in one-to-one correspondence to reference coordinates (0, 0) on the display coordinate system, and then converting coordinates (LPOS, APOS) of the spot under consideration into coordinates (X1, Y1) of a point on the display coordinate system based on the point (MPOS, BPOS) found as above.

The point (MPOS, BPOS) is determined by the following equations:

MPOS=XM−b/LDOT, and

BPOS=YM+a/ADOT where XM, YM are the coordinates corresponding to the center of the display coordinate system, a, b are numbers of dots (FIG. 7B) on the map display screen of the display unit 1, LDOT is the number of dots per unit longitude, and ADOT is the dots per unit latitude, LDOT, ADOT being determined dependent on the designated scale. The point (X1, Y1) is given by the following equations:

X1=(LPOS −MPOS)×LDOT, and

Y1=(BPOS−APOS)×ADOT.

Figures 9A, 9B:
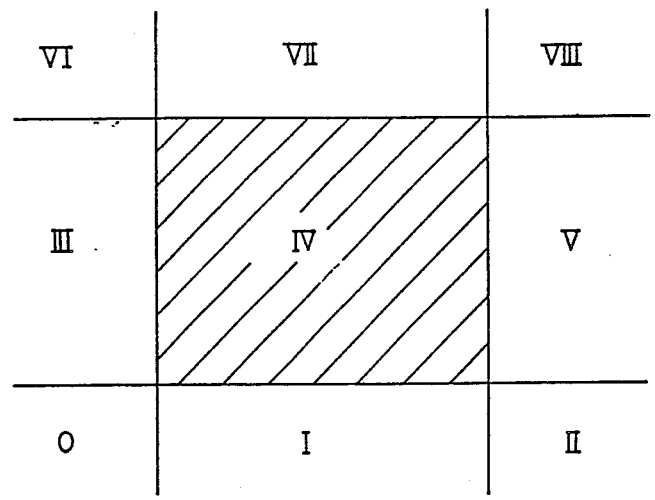

The above region determination processing is effected by ascertaining in which region, out of divided regions 0 through VIII shown in FIG. 9A, the point of the display coordinates (X1, Y1) as determined by the foregoing coordinate transformation is located. The region IV in FIG. 9A corresponds to a hatched region shown in FIG. 8B, that is, a map display region.

When the region A to which the display coordinates (X1, Y1) belong is determined in the step 813, the program returns to the step 806 in which a next spot number in the #i route information series (#1 route information series) is read out.

Then, a step 807 is executed to determine whether the route is ended or not. If not, then a step 808 is executed to determine whether the spot level at the next spot number is of a displayable level. If it is not a displayable level, then the program goes back to the step 806. If it is a displayable level, then the program proceeds to a step 809 which determines whether the spot number is a spot number extracted at first in the #i route information series (#1 route information series).

Since the first spot number has already been extracted at this time, the decision of the step 809 is "NO", and the program performs steps 814 through 817, successively, to effect the same process as that of the steps 810 through 813. That is, the spot coordinates (X, Y) of the spot number (#j spot number) are converted into display coordinates (X2, Y2), and a region B is found to which the display coordinates (X2, Y2) belongs.

Thereafter, a step 818 is executed to determine whether the points (X1, Y1), (X2, Y2) are to be displayed as connected, or the regions A, B have a particular relationship. In case the display coordinates (X1, Y1) belong to the region 0 and the other display coordinates (X2, Y2) belong to any one of the regions 0, I, II, III, VI, a line connecting the display coordinates (X1, Y1), (X2, Y2) does not traverse the region IV, and the step 818 regards the regions A, B as having no particular relationship (indicated by X in FIG. 9B). Where the display coordinates (X1, Y1) belong to the region 0 and the other display coordinates (X2, Y2) belong to any one of the regions IV, V, VII, VIII, a line connecting the display coordinates (X1, Y1), (X2, Y2) traverse the region IV, and the step 818 regards the regions A, B as having a particular relationship (indicated by 0 in FIG. 9B). The other combinations are illustrated in FIG. 9B.

If the regions A, B have no particular relationship, then steps 819, 820 are executed to renew the region A as the region B, and renew the coordinates (X1, Y1) as coordinates (X2, Y2), and the program goes back to the step 806.

If the regions A, B have a particular relationship, then a step 821 is executed to display the line connecting the points (X1, Y1), (X2, Y2) on the display screen. The connecting line is displayed according to the kind of the route. Where the route is a railroad, for example, the connecting line is displayed as indicated at T in FIG. 10B. Then, the steps 819, 820 are executed to effect region and coordinates renewal, and the program returns to the step 806.

Thereafter, the program route containing the steps 806, 807, 808 and the program route containing the steps 806, 807, 808, the steps 809, 814 through 821 (the step 821 excluded as the case may be) are selectively executed until the route end of the #i route (#1 route) is read out, so that the #i route (#1 route) can be displayed.

When the route end of the #i route (#1 route) is read out, the decision of the step 807 becomes "YES", and then the step 805 is executed to renew the address. Now, the processing for a next route (#2 route) will be carried out in the same manner as that of the foregoing #1 route.

Subsequently, the same processing as described above will be effected successively for the route information series. When the #N route information series has been processed, the step 802 decides that the contents of all addresses have been read out. All routes related to the region IV have been displayed, and the map display processing is completed.

The map data storage medium may be a magnetic disk, a magnetic bubble memory or other mediums other than the ROM package and the magnetic tape, with a data reader unit employed for reading data from such storage medium.

While one of the menu selections has been described as being designated by the cursor displayed on the display unit 1, the menu selections may be designated using a speech recognition system.

Although a certain preferred embodiment has been shown and described, it should be understood that many changes and modifications may be made therein without departing from the scope of the appended claims.

What we claim is:

1. An electronic map display system, comprising:
   display means for displaying maps;
   memory means for storing a plurality of sets of spot coordinates of spots defining respective routes, which routes, in turn, constitute said maps, each said set of spot coordinates indicating a point on a first coordinate system with respect to a predetermined coordinate reference point;
   means for defining a region on said first coordinate system, said region corresponding to a single map to be displayed on said display means;
   means for extracting from said memory means sets of spot coordinates of spots in said region;
   means for converting each of said spot coordinates extracted by said extracting means into display coordinates with respect to a predetermined point of a second coordinate system of said display means so that said single map of said region defined by said defining means is displayed on said display means; and
   means for displaying on said display means routes within said region which form said single map, said displayed routes including said display coordinates converted by said converting means and lines connecting said display coordinates converted by said converting means;
   and means for individually selecting a specific route for display by retrieving spot coordinates representing said selected route from said memory means.

2. A map display system according to claim 1, further comprising means for indicating a scale of said single map to be displayed, wherein said defining means defines said region with said scale and a set of spot coordinates of the center of said region.

3. An electronic map display system, comprising:
   display means for displaying maps;
   memory means for storing a plurality of sets of spot coordinates of spots defining respective routes, which routes, in turn, constitute said maps, each said set of spot coordinates indicating a point on a first coordinate system with respect to a predetermined coordinate reference point, and for storing spot numbers of spots constituting each of said respective routes;
   means for defining a region on said first coordinate system, said region corresponding to a single map to be displayed on said display means;

means for reading spot numbers of spots in said region for each respective route in said region from said memory means, and for reading sets of spot coordinates corresponding to each of said read spot numbers from said memory means;

means for converting said sets of read spot coordinates into display coordinates with respect to a predetermined point of a second coordinate system of said display means so that said single map of said region defined by said defining means is displayed on said display means; and means for displaying on said display means routes within said region which form said single map, said displayed routes including said display coordinates and lines connecting said display coordinates;

and means for individually selecting a specific route for display by retrieving spot coordinates representing said selected route from said memory means.

4. A map display system according to claim 3, further comprising means for indicating a scale of said single map to be displayed, wherein said defining means defines said region with said scale and a set of spot coordinates of the center of said region.

* * * * *